Oct. 21, 1969     O. WOLFF ET AL     3,474,246
COMBINED SPECIMEN AIRLOCK AND RAY DEFLECTING
MEANS FOR CORPUSCULAR RAY DEVICE
Filed July 24, 1967     5 Sheets-Sheet 1

United States Patent Office 3,474,246
Patented Oct. 21, 1969

3,474,246
COMBINED SPECIMEN AIRLOCK AND RAY DEFLECTING MEANS FOR CORPUSCULAR RAY DEVICE
Otto Wolff, Alexander Asmus, Willi Schomburg, and Horst Schmidt, Berlin, Germany, assignors to Siemens Aktiengesellschaft, Berlin, Germany, a corporation of Germany
Filed July 24, 1967, Ser. No. 655,651
Claims priority, application Germany, July 27, 1966, S 105,020
Int. Cl. H01j 37/26
U.S. Cl. 250—49.5
35 Claims

ABSTRACT OF THE DISCLOSURE

A corpuscular ray devices, such as an electron microscope, which has a hollow interior which is evacuated during operation of the device. The device includes a deflecting means for deflecting the corpuscular rays and an object airlock member which is adapted to carry a specimen cartridge, the latter member and the deflecting means both being situated over the stage for the object which is to be investigated, when the deflecting means is in an operating position and when the specimen cartridge is also in an operating position. An airlock means coacts with the object airlock member in connection with the introduction of an object into and the removal of an object from the evacuated hollow interior of the device, and this airlock means and the deflecting means are both located at least approximately in a common plane which is normal to the optical axis of the device so that the airlock means and deflecting means are situated one beside the other. A moving means coacts with the deflecting means for displacing it away from its operating position so as to provide in this way clearance for the movement of the object airlock member.

Our invention relates to a corpuscular ray device, such as, for example, an electron or ion microscope or an electron diffraction device, which has a hollow interior which is evacuated during operation of the device.

In particular, our invention realtes to a device of this type which is provided with a deflecting means for deflecting the corpuscular rays and which also is provided with an object airlock member which together with the deflecting means is situated in the corpuscular ray path over the stage which receives the object which is to be investigated.

It is customary to provide with corpuscular ray devices of this type structures which render it possible to adjust the source of the corpuscular rays with respect to the optical axis of the device. Frequently it is desired to change the angle at which the corpuscular rays impinge upon the object which is under investigation. The movements of the ray generator which are required for this purpose can be made possible by providing for the ray generator, as well as for the condenser lenses which follow the ray generator in the direction of the ray path, in some cases, a shifting movement transversely with respect to the optical axis of the device or a swinging movement along an arc of a circle whose center is situated at the object. The approach has been, however, to eliminate the very narrow tolerances of the components which are required for these purposes as well as the seals between the moving parts required for the mechanical adjustments and instead to adjust the ray by means of an electrostatic and/or electromagnetic deflecting means which is situated over the object, so as to carry out the required adjustments in this manner. Such deflecting systems are described, for example, in German Patent 1,088,628.

When using such electrical deflecting systems, however, for the corpuscular ray, difficulties are encountered in that on the one hand with an increasing distance between the deflecting means and the object an increasing deflecting astigmatism is encountered while on the other hand in the immediate vicinity of the object there is as a rule no available space in the device for mounting the ray-deflecting means. In conventional corpuscular ray device, the space above the object stage is occupied during operation of the device by components of an airlock system for the object.

It is accordingly a primary object of our invention to provide a corpuscular ray device with a ray-deflecting means and with an object airlock member while avoiding the above difficulties.

In particular, it is an object of our invention to provide for a corpuscular ray device of the above type a construction which will compel the deflecting means to move with respect to the airlock means in such a way that the object airlock member, which carries the specimen cartridge, can be displaced to and from its operating position at the optical axis without any interference from the deflecting means.

Furthermore, it is an object of our invention to provide for a construction of this type a structure which operates in a fully automatic manner during introduction and removal of an object into and out of the device, respectively, to provide for clearance for the movement of the specimen cartridge while at the same time guaranteeing that during operation of the device the deflecting means will be properly situated at the optical axis.

In addition, it is an object of our invention to provide a device of this type which will automatically situate the deflecting means at the optical axis when the specimen cartridge is situated in an airlock chamber of the device.

It is also an object of our invention to provide a construction which will enable the airlock means either to remain connected with the object airlock member which carries the specimen cartridge during operation of the device or which enables the airlock means to be separated from the object airlock member during operation of the device.

Also, it is an object of our invention to provide a very compact structure which can be mounted in a vacuum-tight manner on the device to transmit the drives from the exterior to the interior of the device without risking any communication between the interior of the device and the outer atmosphere.

Furthermore, it is an object of the invention to provide a construction which will automatically guarantee that when an inner door of the airlock chamber is open, the outer door thereof is closed while when the outer door is open the inner door is necessarily closed.

Furthermore, it is an object of our invention to provide a construction wherein all of the required movements can be brought about by simple manual turning of manually engageable members which are supported for rotary movement.

Thus, in accordance with our invention both the object airlock member, which carries the specimen cartridge, and the deflecting means for deflecting the corpuscular rays are situated in the path of the corpuscular rays during operation of the device, over the stage which receives the object which is to be investigated. An airlock means which coacts with the object airlock member in connection with the introduction of an object into and the removal of an object from the evacuated interior of the device, is situated beside the deflecting means at least approximately in a plane normal to the optical axis and in which the deflecting means is located. A moving means coacts with the deflecting means for moving the latter away from its operating position so as to provide in this way clearance for the movement of the airlock member. A drive means coacts with the airlock means to drive the latter, and this latter drive means and the moving means for the deflecting means are connected to each other by way of a coupling means of our invention which compels the deflecting means to be displaced from its operating position during movement of the object airlock member between its operating position and an airlock position where it is situated at an airlock chamber of the device.

Our invention is illustrated by way of example in the accompanying drawings which form part of this application and in which.

Figure 1:
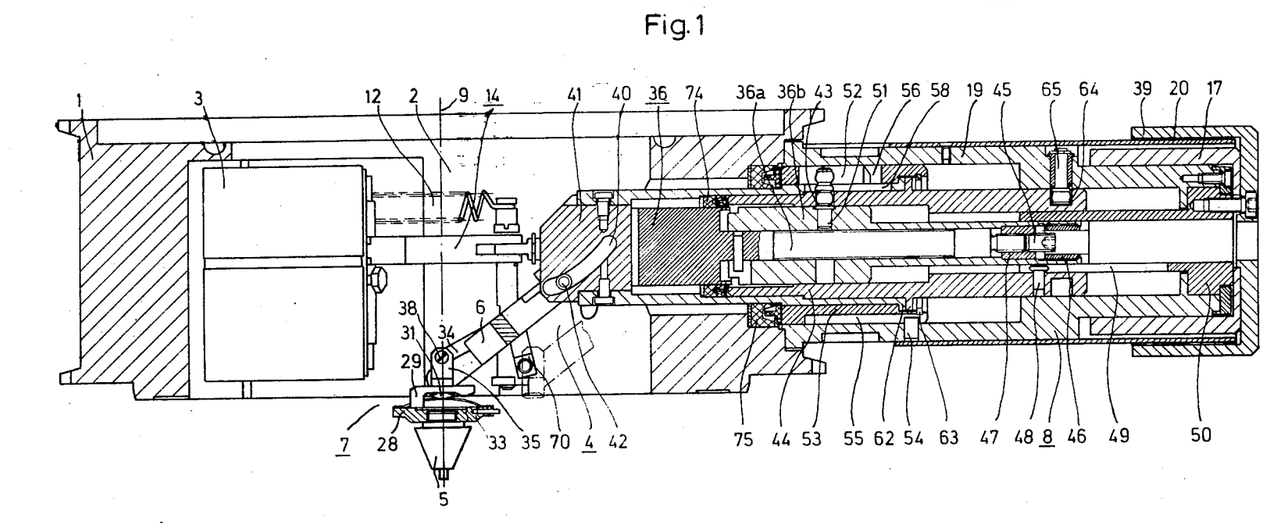
FIG. 1 is a vertical sectional elevation of a construction according to our invention taken at that region of an electron microscope where the object stage is situated, the vertical sectional plane of FIG. 1 containing the optical axis of the device and the structure which is illustrated in FIG. 1 being situated over the objective and further imaging lenses and under the condenser lenses and ray generator which are conventional and therefore unillustrated.

Referring now to the drawings, there is illustrated therein the outer annular component 1 of the housing of the electron microscope, this housing wall 1 surrounding part of and defining part of the evacuated chamber 2 of the electron microscope. Thus, this outer housing wall 1 forms part of an elongated tubular column whose interior provides the evacuated space for the device in a well known manner. In accordance with our invention there are situated in the same or approximately the same plane, beside each other, and a known deflecting means 3 for deflecting the electron rays and an airlock means 4 which carries and moves the specimen cartridge 5. In the case of FIG. 1 the specimen cartridge 5 is situated at its operating position where it has been introduced into an unillustrated object stage by means of the airlock means 4. The airlock means 4 includes a holding member 6 in the form of a lever which holds an object airlock member 28 in the form of a plate which carries the specimen cartridge 5, the connection between the holding lever 6 of the airlock means 4 and the object airlock member 28 being provided by way of a detachable connecting structure 7 which together with the airlock means is described in greater detail below.

Figure 2:
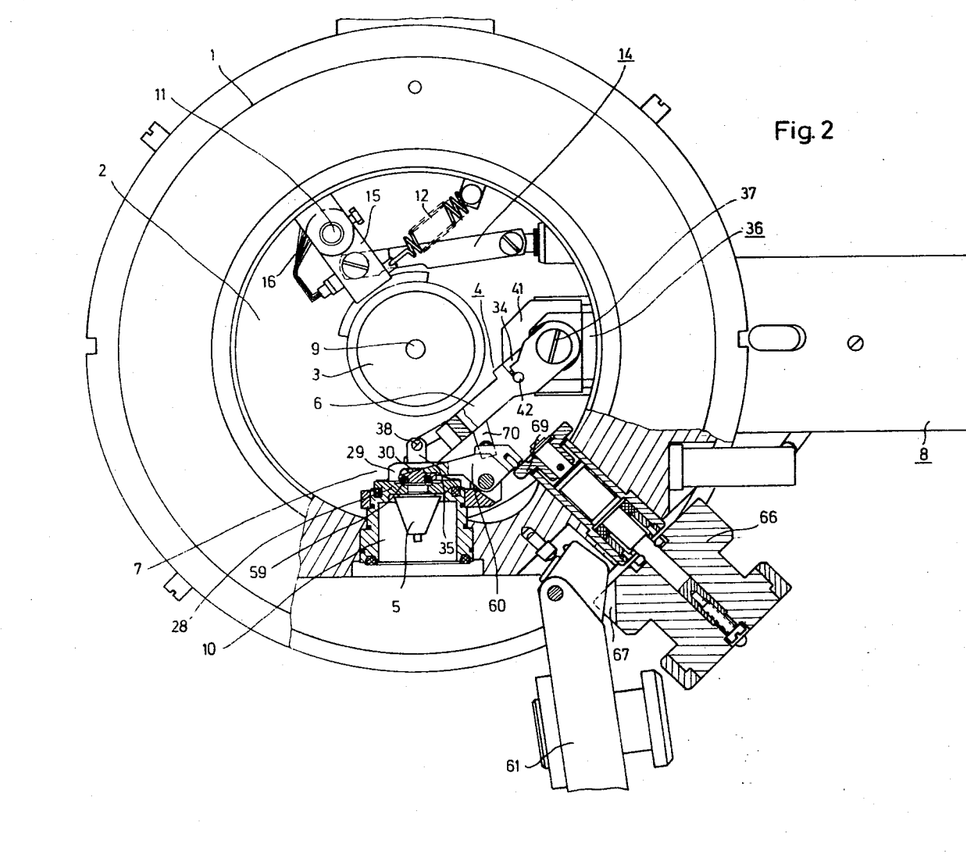
FIG. 2 is a partly sectional horizontal plan view of the structure of FIG. 1, taken in the plane of the object stage, FIG. 2 showing in section details of the structure which coacts with the airlock chamber.

While the specimen cartridge 5 is shown in one of its end positions in FIG. 1, namely in its operating position situated along the optical axis 9, it is shown at its other end position, namely in an airlock position where it is situated at an airlock chamber 10 of the device, in FIG. 2. The airlock means 4 is moved by way of a rotary drive means 8 which has an axis extending perpendicularly across the electron ray axis 9 in a plane which contains the axis of the airlock chamber 10. Thus, in order for the specimen cartridge 5 to be moved from the operating position thereof shown in FIG. 1 into the airlock position shown in FIG. 2, it is necessary for the cartridge 5 to be turned through an angle of 90°.

Figure 3:
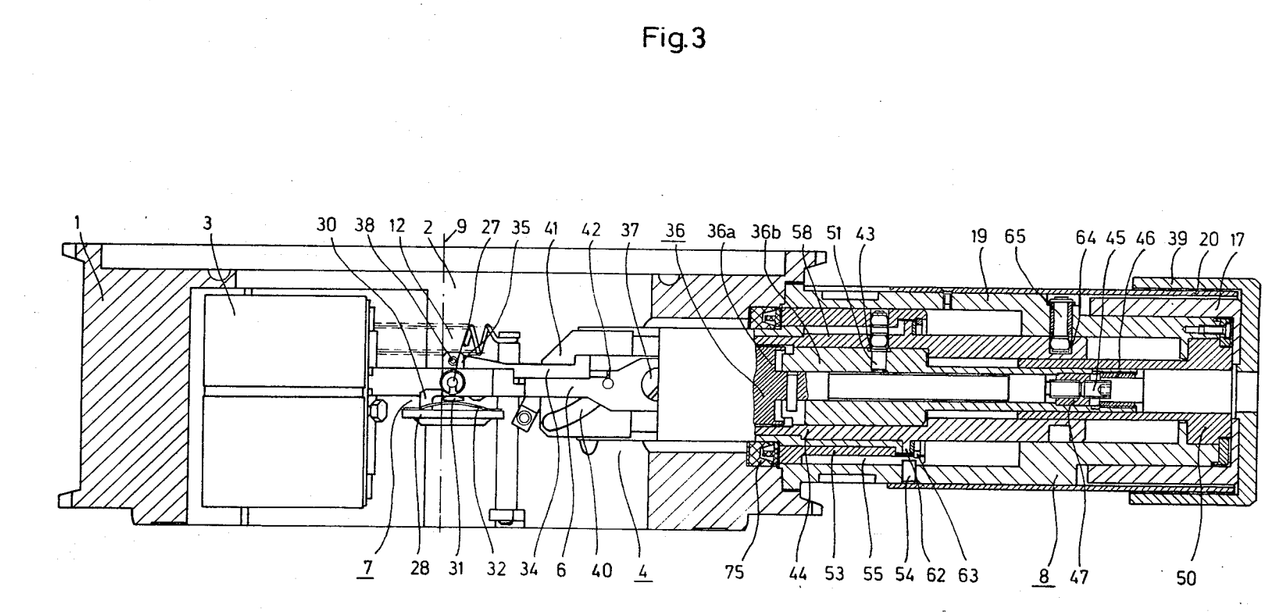
FIG. 3 is a sectional elevation taken in the same plane as FIG. 1 but showing the components in a position different from that of FIG. 1.

This turning of the specimen cartridge 5, however, can only be carried out after the specimen cartridge 5 is raised in the direction of the ray axis 9 from the position shown in FIG. 1 away from the object stage. An intermediate position of the object airlock member 28 when it situates the specimen cartridge carried thereby between the positions of FIGS. 1 and 2, respectively, is illustrated in FIG. 3. During this displacement of the specimen cartridge between its end positions respectively illustrated in FIGS. 1 and 2, the object airlock member 28 which carries the same not only moves along the axis 9 but also to a small extent in a direction transverse thereto.

Figure 4:
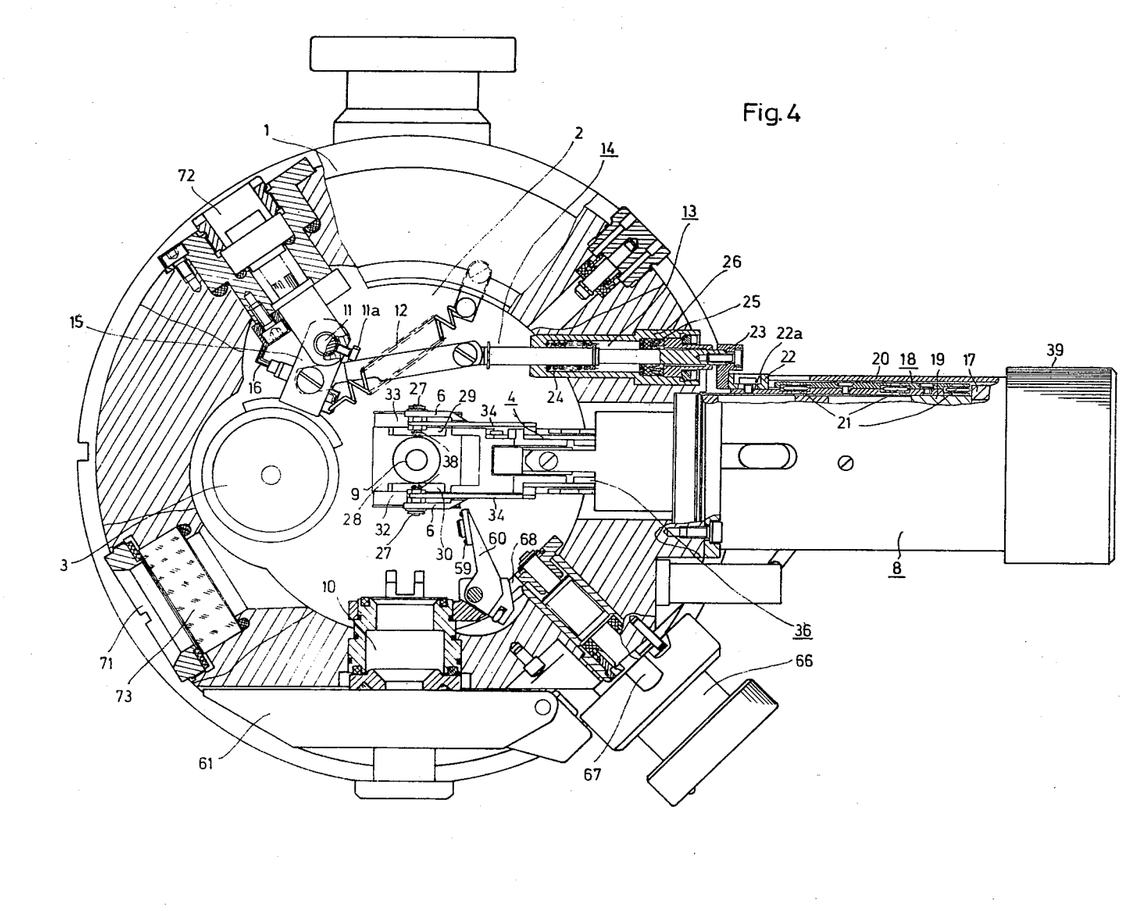
FIG. 4 is a horizontal sectional plan view of the structure showing details in addition to those shown in FIG. 2 and showing the airlock chamber doors in a position different from that of FIG. 2.

In the plan view of FIG. 4, the airlock means is illustrated in a position corresponding to that of FIG. 3.

In the case of FIGS. 1, 3 and 4, the deflecting means 3 is shown displaced from its operating position which is illustrated in FIG. 2, so that in this way there will be available space for the movement of the specimen cartridge 5. As is particularly apparent from FIGS. 2 and 4, the deflecting means 3 is supported for swinging movement by way of a pin or rod 11 which has a stationary axis and which is supported by any suitable brackets. A spring means, which includes the spring 12, acts on the deflecting means 3 to urge the latter to its operating position shown in FIG. 2 so that when the deflecting means 3 is displaced from its operating position, this latter displacement takes place in opposition to the spring 12. A moving means is operatively connected with the deflecting means 3 for moving the latter between its positions, while a drive means 8 is provided for actuating the airlock means 4, and when the airlock means 4 is actuated by the drive means 8 the moving means which swings the deflecting means 3 is also actuated, in a manner described below. The moving means for the deflecting means 3 includes a structure which extends slidably and fluid-tightly through a guide 13 (FIG. 4) which itself is mounted in a fluid-tight manner on the housing wall 1. In this way the movement provided for the deflecting means 3 by its moving means can be directed through the housing 1 in a vacuum-tight manner. This moving means 14 includes the linkage system shown in FIG. 4. The linkage of the moving means 14 is operatively connected with the swingable lever 15 which directly carries the deflecting means and which is pivotally mounted by the pin 11. This swing-lever 15 also serves to carry the conductors 16 through which energy is supplied to the elements of the deflecting means 3.

The moving means 14 is actuated in conjunction with the rotary drive means 8 for the airlock means 4 by way of a coupling means which includes a cam cylinder 17 which during its rotation will bring about swinging of the deflecting means 3 about the axis of the pin 11. FIG. 4 shows only the inner edge of the cam cylinder 17. This inner edge forms a cam. An elongated plunger 18 forms a follower which engages the cam at the inner edge of the cam cylinder 17, this plunger 18 being visible only in FIG. 4 and being guided for longitudinal movement by a guide sleeve 19. This sleeve 19 does not participate in the rotary movement of the drive means 8 and is formed at its exterior with a longitudinal groove which accommodates the plunger 18 so that the latter is guided for longitudinal movement in this guide groove of the sleeve 19. The sleeve 19 is itself surrounded by an exterior sleeve 20 which thus forms with the guide groove of the sleeve 19 a compartment for the plunger 18, and in accordance with the angular turning of the cylinder 17 the plunger 18 will assume different longitudinal locations. In order to reduce the frictional engagement between the cam cylinder 17 and the plunger 18, the plunger 18 is provided with a plurality of rollers 21, one of which directly engages the cam formed at the inner edge of the cylinder 17 and the others of which have rolling contact with the surfaces of the sleeve 19 which form the guide groove thereof. As is apparent from FIG. 4, the plunger 18 carries at its inner end a stop member 22 which in turn engages a stop member 23 fixed to the outer end of a rod of the moving means 14 which extends through the enclosure 13 in a vacuum-tight manner. A spring 24 acts on a collar which is fixed to this rod so as to urge the latter to the right, and in this way the stop 23 is maintained in engagement with the stop 22, while the outer end of the plunger 18 is maintained at the right roller 21, shown in FIG. 4, in engagement with the camming edge of the cylinder cam 17. The rod which carries the stop 23 is surrounded by a grooved annular sealing sleeve 25 so that it has a vacuum-tight movement longitudinally through the sleeve 26 which forms the enclosure 13 which is in turn mounted in a vacuum-tight manner on the housing 1 passing through the wall thereof.

As will be apparent from the description below in connection with FIG. 5, the inner camming edge of the cam cylinder 17 has a configuration which situates the deflecting means 3 in its operating position both when the specimen cartridge is in its operating position as well as when the specimen cartridge is in the airlock position thereof shown in FIG. 2.

The details of the airlock means 4 and the drive means 8 coacting therewith will now be described.

As may be seen, for example, in FIG. 3, the airlock means 4 includes an elongated holding member or lever 6 which carries the object airlock member 28 which in turn carries the specimen cartridge 5. This lever 6 carries the plate 28 by way of a turnable joint structure 27. The plate 28 fixedly carries at its upper surface which is directed away from the surface from which the cartridge specimen 5 extends a pair of elongated claw members 29 and 30 which have openings directed toward the right, as viewed in FIGS. 2 and 4. The lever 6 in turn is connected with a pair of transverse lugs 31 which extend beneath and engage the open claws 29 and 30. A pair of leaf springs 32 and 33 carried by the upper surface of the plate 28, as shown most clearly for the spring 32 in FIG. 3, press against the lugs 31 and respectively urge the latter against the horizontal arms of the claws 29 and 30.

In the position of the parts shown in FIG. 1, the leaf springs 32 and 33 also serve to press the specimen cartridge, under the action of lever 6, in a springy yieldable manner against the unillustrated object stage. The lever 6 is, as indicated in FIG. 4, a double lever having a pair of identically constructed portions which are coextensive and aligned with each other and which respectively coact with the joints 27 and through the latter with the lugs 31. By this double construction of the lever 6 a tilting of the object airlock 28 at its connection to the airlock means 4 by way of the connecting means 7 is avoided.

In order that the axis of the specimen cartridge will always have a predetermined, well-defined position, which is to say either coinciding with the corpuscular ray axis or with the axis of the airlock chamber 10 when the object airlock member 28 is in the airlock position of FIG. 2, each lever 6 coacts with an additional lever 34 which together with the component 35 and the output member 36 of the drive means 8 forms a parallelogram linkage. This output member of the rotary drive means 8 has the end of the lever 6 which is distant from the object airlock member 28 pivotally connected thereto for swinging movement about the axis of a pivot structure 37, and the lever 34 is also pivotally connected with the output member 36 for turning movement with respect thereto about an axis parallel to the axis provided by the pivot member 37, this turning axis of the lever 34 at the output member 36 being situated somewhat higher than the turning axis provided by the pivot 37 as considered for the formation of the parallelogram linkage. As a result, the levers 6 and 34, at their pivotal connections 27 and 38, respectively, with the component 35 of the connecting means 7, serve to maintain the axis of the specimen cartridge 5 at all times extending in a predetermined direction while moving the specimen cartridge 5 along a straight line when the specimen cartridge 5 is moved.

Starting from the operating position of the specimen cartridge shown in FIG. 1, where it is located at the object stage, in order to remove the object through the airlock structure, it is necessary for the specimen cartridge 5 to be moved by way of the lever 6 of the airlock means 4 initially in the direction of the ray axis 9 upwardly. This movement is brought about by reason of the fact that the output member 36 of the drive means 8, at which the pivotal connection 37 is provided, is advanced to the right, as viewed in FIG. 1, upon actuation of the rotary manually engageable member 39 at the outer end of the drive means 8, this movement of the output member 36 to the right continuing until the output member 36 has the position indicated in FIG. 3. As a result, the output member 36 pulls, through the pivotal connection 37, on the lever 6 (and through the additional pivotal connection on the lever 34), so that the right end of the lever 6 also advances to the right, from the position of FIG. 1 to the position of FIG. 3. This movement of the output member 36 and the levers 6 and 34 takes place with respect to a cam slide 41 formed with an arcuate cutout 40, which extends along an arc of a circle and which receives a cam-follower roller 42 connected to the lever 6, for rotary movement with respect to the latter, so that by the coaction of the follower 42 with the camming slot 40 of the cam slide 41, the lever 6 is swung upwardly from the position of FIG. 1 to the position of FIG. 3 during displacement of the lever 6 together with the output member 36 to the right from the position of FIG. 1 to the position of FIG. 3. Thus, the result of the action on the lever 6 provided by the cam slide 41 in coaction with the component 36 is illustrated in FIG. 3. The specimen cartridge 5 can now be freely swung so that it can be displaced into the airlock position shown in FIG. 2.

In order to convert the rotary movement of the manually turnable member 39 into the longitudinal movement of the output member 36, this member 36 extends into a cam cylinder 44 which surrounds the component 36 and which is formed with a camming slot 43 of predetermined configuration. The cam cylinder 44 coaxially surrounds the output member 36 of the drive means 8, and this output member 36 is made up, in the illustrated example, of a pair of components 36a and 36b which are connected together, but which can have their positions with respect to each other changed upon loosening of lock screws 45 and 46 for the purpose of adjusting the stroke of the lever 6 and the force of the springs 32 and 33 during the operation. For this purpose it is only necessary to turn the screw 47. After the adjustment is made by the screw 47 the lock screws 45 and 46 can again be tightened.

The cam cylinder 44 which surrounds the output member 36 forms an inner cam cylinder, and this cam cylinder 44 carries adjacent its right end, as viewed in FIG. 1, a pin 48 on which a roller is supported for free rotary movement, this roller being received in an axially extending slot 49 of an elongated tubular component 50 which is fixed with the manually engageable member 39 for rotary movement therewith. In this way the inner cam cylinder 44 is fixed to the knob or manually engageable member 39 for rotary movement therewith.

The output member 36 itself fixedly carries a cam follower pin 51 provided with a roller which is freely rotatable thereon and received in the camming slot 43 of the inner cam cylinder 44, so that in accordance with the configuration of the camming slot 43 the rotary movement of the cam cylinder 44 will provide a longitudinal shifting of the output member 36 along the axis of the drive means 8, this latter axis extending perpendicularly with respect to and intersecting the optical axis. This longitudinal shifting of the output member 36 will take place as long as an outer roller of the cam follower pin 51 is capable of also moving axially in a cutout which forms a camming slot in an outer stationary cam cylinder 53 which coaxially surrounds the inner cam cylinder 44. This camming cutout has an axially extending region 52 which provides for the axial shifting of the output member 36 as long as its outer cam follower roller extends along the axially extending portion 52 of the camming slot of the outer cylinder 53. This outer cam cylinder 53 is prevented from turning by a pin 44 carried by the fixed component 19 and received in a longitudinal groove 55 extending axially along the exterior surface of the outer cylinder 53.

Figure 6:
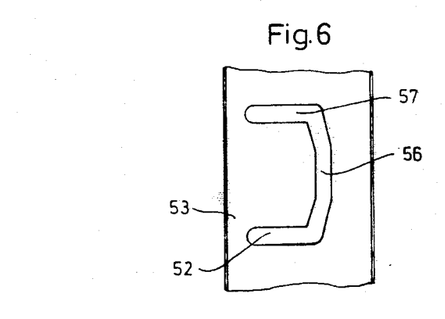
FIG. 6 is an additional schematic representation showing a camming structure in a developed view.

As soon as the lever 6 reaches the position shown in FIG. 3, the cam follower pin 51 reaches, as the result of the corresponding axial shifting movement of the output member 36, the right or outer end of the portion 52 of the cam slot within the outer cam cylinder 53, and now the cam follower will be received in the transverse region 56 of the cam slot of the cylinder 53, this cam slot having a U-shaped configuration whose opening is directed inwardly toward the interior of the housing 1, as is particularly apparent from FIG. 6. FIG. 6 shows the cam slot of the cylinder 53 in a developed view. Thus, it is apparent from FIG. 6 that the cam slot includes a pair of regions 52 and 57 which extend parallel to the axis of the drive means 8, and the region 52 has already been referred to above, this region resulting in the above-described movement of the specimen cartridge from the position of FIG. 1 in which it is shown in its operating position. After the follower 51 of the output member 36 advances through the transverse portion 56 of the cam slot of the outer cam cylinder 53, it will reach the other straight portion 57 which extends parallel to the axis of the drive means, and during movement along this portion 57 the specimen cartridge will be displaced, by swinging of the lever 6, into the position shown in FIG. 2. In this latter airlock position of the specimen cartridge the axis of the latter coincides with the axis of the airlock chamber 10. The intermediate region 56 of the cam slot of the outer cylinder 53 is rounded or inclined at its ends so that the change in direction of movement of the cam follower pin 51 is facilitated.

It is thus apparent that the above-described movement of the specimen cartridge 5 in the direction of the electron ray 9 (FIG. 1) and perpendicularly thereto (FIG. 2) is brought about solely by rotary movement of the inner cam cylinder 44 by reason of the configuration of the cam slot 43 thereof, in combination with the regions 52 and 57 of the cam slot in the outer cam cylinder 53 which does not participate in the rotary movement. When the follower pin 51 of the output member 36 is situated at the starting end of the region 56 of the cam slot in the outer cam cylinder 53, the axial shifting movement of the output member 36 and thus the movement provided for the specimen cartridge 5 by swinging of the lever 6 under the influence of the cam slot 40 of the cam slide 41 is terminated. This latter movement is followed by a swinging of the airlock means through an angle of 90°. Since at this part of the operation the cam slot in the outer cam cylinder 53 does not extend linearly, the rotary movement of the inner cam cylinder 44 in coaction with the predetermined configuration of its camming slot 43 brings about a rotary movement of the output member 36 in which the cam slide 41 also participates. The cam slide has a tubular portion in the form of a sleeve which surrounds the component 36 and the inner cam cyilnder 44, and this sleeve portion of the cam slide 41 is formed with an axially extending slot 58 through which the cam follower pin 51 extends, so that the cam slide 41 necessarily turns with the output member 36 by reason of the action of the cam follower pin 51 on a side edge of the slot 58 of the sleeve of the cam slide 41.

The turning movement of the specimen cartridge is terminated when the follower pin advanced from the transverse region 56 of the cam slot of the outer cylinder 53 (FIG. 6) into the region 57, this latter region in combination with a suitable configuration of the slot 43 in the inner cylinder 44 providing again for the specimen cartridge, which cooperation of the cam slide 41, a movement of the parts to the airlock position shown in FIG. 2.

As has already been pointed out above, the lever 6 of the airlock means is releasably connected by the coupling structure 7 with the object airlock member 28 in the form of a plate which carries the specimen cartridge. This plate 28 forms together with the seal 59 and the pawl 60 (FIGS. 2 and 4) the inner airlock door of the airlock chamber 10 of the airlock structure. The outer airlock door 61 is also illustrated in FIGS. 2 and 4.

In order to be able to release the connection 7 when the specimen cartridge 5 is in its operating position shown in FIG. 1, an additional movement of the lever 6 is required in a direction which displaces the transverse lugs 31 out of the region of the claw members 29 and 30. During this movement there should not be either any turning movement or any movement along the axis of the specimen cartridge 5 by way of the action of the cam slide 41. Instead it is required simply that the lever 6 be shifted to the dotted line position indicated in FIG. 1 without turning so that it remains in the dotted line position of FIG. 1 parallel to the solid line position illustrated in FIG. 1. For these reasons the rotary drive means 8 of the airlock means is provided with a structure which is capable of bringing about a movement of the output member 36 together with the cam slide 41 along the axis of the rotary drive means 8.

Thus, the cam slide 41 is provided at the right end of its tubular sleeve portion, as viewed in FIGS. 1 and 3, with an outwardly directed flange or collar 62 which is received in an opening which is formed at the inner surface of the outer cam cylinder 53, so that the cam slide 41 cannot be displaced axially with respect to the cam cylinder 53 but at the same time can turn with respect thereto. This outer cam cylinder 53 is in turn held axially with respect to the inner cam cylinder 44 by way of a snap ring 63. Therefore, when the inner cam cylinder 44 carries out a movement along the axis of the drive means 8, the lever 6 will be shifted from the solid to the dotted position indicated in FIG. 1 without changing its inclination. This axial shifting of the inner cam cylinder 44 is brought about by way of a second opening 64 which is formed in the cam cylinder 44 adjacent its right end, as viewed in FIGS. 1 and 3, the opening 64 having a predetermined camming configuration and receiving a cam follower pin 65 which is carried by the stationary component 19. Thus, when the cam cylinder 44 turns the cam groove 64 thereof coacts with the follower 65 to bring about, in accordance with the configuration of the camming groove 64, the release of the connection between the lever 6 and the plate 28, during movement of the lever 6 to the right from the solid to the dotted line position shown in FIG. 1, while this connection can be reestablished during the reverse movement of the lever 6 to the left from the dotted to the solid line position of FIG. 1.

Figure 5:
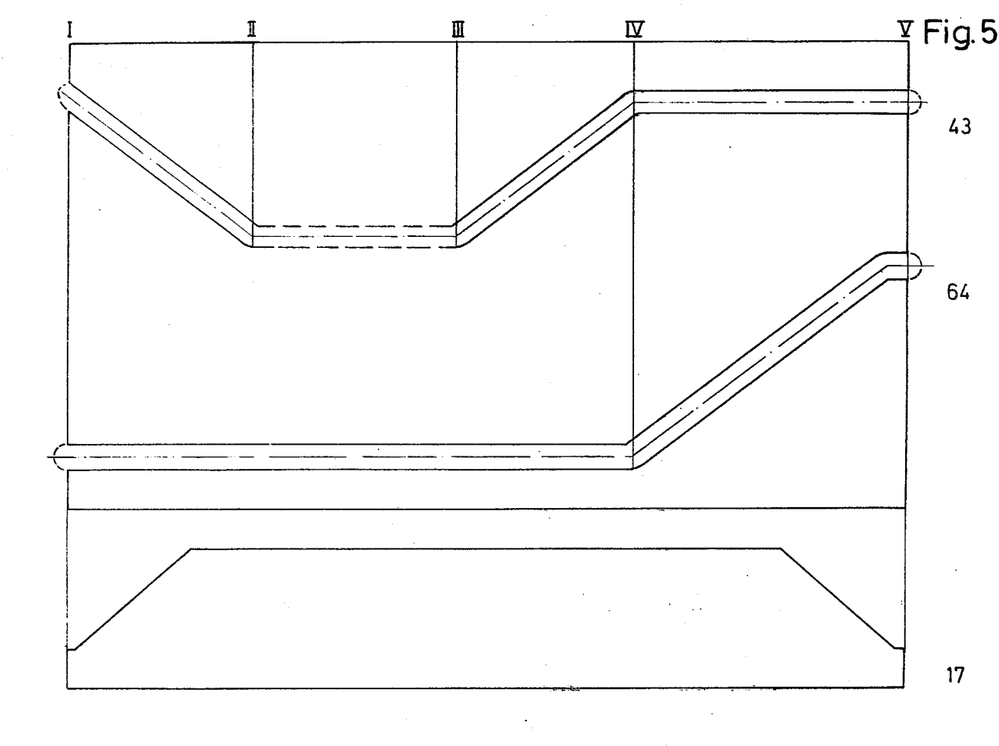
FIG. 5 is a diagrammatic representation of the relationship between several camming surfaces of the structure of our invention, these camming surfaces being shown in a developed schematic view in FIG. 5.

In order to further explain and in particular to illustrate the configuration and coaction between the various cams of the cam cylinders, these structures are diagrammatically illustrated in FIG. 5 which shows in a developed schematic view the configuration of the camming cutouts 43 and 64 as well as the cam at the inner edge of the cam cylinder 17 for actuating the moving means for displacing the deflecting means 3, these camming portions being shown with respect to cam cylinders which have equal diameters. Starting from the position indicated at I at the left of FIG. 5, where the specimen cartridge 5 is situated at the airlock chamber 10, then there will initially be provided, by way of the camming portion 43, a movement of the specimen cartridge along its own axis out of the position thereof shown in FIG. 2. Simultaneously, the cam cylinder 17 provides a turning of the deflecting means 3 away from its operating position in the ray path laterally to its inoperative position. This latter movement is followed, while the deflecting means 3 is maintained in its inoperative position, by a control of the movement through the intermediate portion 56 of the cam of the cam cylinder 53 which is illustrated in FIG. 6, with the result that the specimen cartridge is now swung about the axis of the drive means 8 to a location where it axis will coincide with the optical axis. Inasmuch as at this time there is no relative movement between the follower pin 51 and the inner cam cylinder 44, there is shown in FIG. 5 between the positions II and III a portion of no movement or actuation by the cam 43, so that at the positions II and III the cam 43 is to be considered as having only a single portion which is identical for both of these positions. After this swinging movement of the specimen cartridge 5, the movement from position III to position IV takes place, so that the specimen cartridge is now displaced to the operating position thereof shown in FIG. 1. The deflecting means 3 is still maintained in its inoperative position in accordance with the configuration of the cam cylinder 17, as indicated in the developed diagram thereof in FIG. 5.

It is only at this point that the camming portion 64 of the inner cylinder 44 becomes effective to bring about the disconnection of the lever 6 from the plate 28, and at this time the lever 6 will be displaced to the right to the dotted line position of FIG. 1, as described above, so that the connecting means 7 is released. Now there is a free space for the deflecting means 3 which is released by the cam cylinder 17 so that it can be moved by the spring means 12 into the operating position, corresponding to position V of FIG. 5.

The removal of an object from the electron microscope through the airlock structure takes place with the reverse of these operations.

As has already been pointed out, the inner airlock door is formed by the plate 28 together with the pawl 60. This pawl 60 and the outer airlock door 61 are controlled by way of a rotary drive 66 which is accessible to the operator so as to be manually turned. This drive has the cutouts 67 and 68 (FIG. 4) which are arranged in such a way that either the inner or the outer airlock door are released for displacement to the open position. Thus, in accordance with the selection of the position of the drive 66 as made by the operator it will be possible to open only one of the airlock doors while the other airlock door is necessarily in its closed position. Thus, the member 69 which is fixed to the inner end of the rotary drive 66 is capable of preventing turning of the pawl 60 in a direction which will release the inner door 28 for opening movement. As may be seen from FIG. 2 the member 69 is situated in the path of movement of the pawl 60, in a clockwise direction, as viewed in FIG. 2, which would be required to release the inner door for displacement to its open position. For this purpose the lever 6 carries a projection 70 (FIGS. 1 and 2) which presses the pawl 60 to the airlock position of the parts shown in FIG. 2 as the cartridge 5 is displaced into the airlock chamber 10 up to the position shown in FIG. 2.

Of course, the movement of the deflecting means transversely with respect to the optical axis of the device can be achieved by way of other structures. For example, in the case where the object airlock structure is movable transversely to the optical axis, it is possible to arrange the deflecting means at an end of the object airlock structure. As has already been pointed out, the rotary drive means 8 can be formed in such a way that the specimen cartridge carries out other movements during movement of the object into and out of the device. Furthermore, it is in principle also possible to do away with the structure for releasing the connection 7. In order to increase the various possible uses of the device, the openings 71 and 72 indicated in FIG. 4 may be provided in the housing 1. The opening 71 can receive a glass disc 73 which serves as an observation window. The pivot pin 11 can, for the purpose of adjusting the deflecting means, be provided with an eccentric central portion at its bearing. The set screw 11a (FIG. 4) serves to hold the pivot 11 in its adjusted position. Also, for the purpose of adjustment the stop member 22 is provided with an elongated slot 22a (FIG. 4).

As may be seen from FIG. 1, the vacuum seals 74 and 75 are arranged in such a way that the cutouts of the cam cylinders are situated outwardly beyond the evacuated interior 2 of the device, and thus when the cam cylinders are lubricated at their camming portions, it is unnecessary to exercise any care with respect to the possible danger of contamination of the object.

Our invention enables the corpuscular ray to be adjusted not only with respect to the optical axis of the device but also with respect to a change in the impingement angle of the ray on the object, as is required, for example, with reflection microscopes and dark-field imaging. For certain purposes, when carrying out certain investigations, it may be of advantage to arrange the holder for the deflecting means in such a way that it can be exchanged for a diaphragm or for another component required in connection with the investigation. The abovedescribed structures can also be used when there is initially no deflecting means but instead any other device, such as a diaphragm which is required to be moved away from the corpuscular ray path at predetermined positions of the airlock means.

In those cases where the space available within the corpuscular ray device does not permit the deflecting means to be displaced in a plane which is transverse to the optical axis of the device, the concept of our invention can still be used advantageously by providing a construction where the deflecting means and the airlock means are situated during operation of the deflecting means at least approximately in the same plane which is transverse to the optical axis of the device, beside each other, with the deflecting means supported for movement in the direction of the optical axis, for example, by way of suitable gearing such as a rack and pinion. Such a construction will require a greater height for the device.

Where a multiple-stage deflecting means is used for deflecting the corpuscular ray in a plurality of directions, such as in a pair of mutually perpendicular directions, it is of advantage to fix individual stages of the deflecting means to the object stage or in another support for the object, surrounding the latter, while supporting only the remaining stages of the deflecting means for movement transverse to the optical axis.

It is thus apparent that with the structure of our invention there can be no interference between the movement of the defletcing means and the object by way of the airlock means. While it might be considered only essential to locate the deflecting means in its operating position when the object is in its operating position, it is in fact often of advantage to have the possibility of adjusting the rays before the object is introduced into the object stage, so that, for example, unnecessary loading of the object can be avoided. For this reason the structure of our invention provides a coupling means between the moving means for the deflecting means and the drive means for the airlock means which will situate the deflecting means in its operating position not only when the object is in its operating position but also when the object is in its airlock position. Thus, with our invention it is possible to provide for displacement of the deflecting means from its operating position only during those times when the structure which carries the object moves through the space occupied by the deflecting means when the latter is in its operating position.

Furthermore, while a specific example of the cam cylinders has been presented above, it is to be understood that the camming configurations can be changed to adapt the cycles of movement to different types of airlock devices.

Instead of a manual actuation of the drive means 8, it is also possible to use a gear or friction drive which is directly or indirectly driven through an adjusting motor. It is then possible through such adjusting motors to provide a remote control for the airlock operations while bringing about also the required movements of the deflecting means.

While the curved camming portion 40 of the cam slide 41 can take the form of a parabola, it is preferred to make it in the form of an arc of a circle for simplicity of manufacture.

The configurations of the various cams is chosen in such a way that the deflecting means is displaced from its operating position at a speed greater than the speed with which the object moves. Such a construction is particularly provided in the case where the deflecting means carries out a swinging movement so that the path of movement of the deflecting means is longer than that of the object.

One of the great advantages resulting from the use of an electrical deflecting means, instead of a mechanical adjusting structure, resides in the fact that it is unnecessary to provide grease or oil in the vacuum chamber. In order to maintain this advantage the seals 74 and 75 are provided in the manner described above in connection with FIG. 1.

It is to be noted that when the specimen cartridge is in the airlock position shown in FIG. 2, the opening through the plate 28 provided for the corpuscular ray is closed by a corresponding projection or the like on the pawl 60.

We claim:

1. In a corpuscular ray device, such as an electron microscope, which has a hollow interior which is evacuated during operation, deflecting means for deflecting the corpuscular ray, said deflecting means having an operating position situated in the path of movement of the corpuscular ray, an object airlock member also having an operating position situated in the path of movement of the corpuscular ray, said airlock member and said deflecting means both being situated over a stage for the object which is to be investigated, airlock means situated beside said deflecting means, when the latter is in said operating position thereof, at least approximately in a plane which is normal to the optical axis of the device and in which said deflecting means is located when in said operating position thereof, said airlock means coacting with said airlock member during introuction and removal of an object into and out of, respectively, the evacuated interior of the device, and moving means coacting with said deflecting means for moving the latter away from said operating position thereof to provide clearance for movement of said airlock member to and from said air lock means.

2. The combination of claim 1 and wherein said moving means coacts with said deflecting means for moving the latter transversely with respect to the optical axis into and out of the path of the corpuscular ray.

3. The combination of claim 1 and wherein said airlock means includes a holding member which holds said object airlock member said airlock means acting through said holding member thereof on said object airlock member to displace the latter transversely with respect to the ray axis as well as along the ray axis during setting of the object into and removal of the latter from the object stage, said airlock means remaining connected with the object after the latter is introduced into the object stage and said deflecting means being situated in its operating position along the ray axis directly over said holding member of said airlock means.

4. The combination of claim 1 and wherein said airlock means coacts with the object to be separated therefrom after the object has been introduced into the object stage, said airlock means then assuming a position spaced from the corpuscular ray path, and said deflecting means being situated in its operating position along the ray axis directly over the object stage.

5. The combination of claim 1 and wherein a mounting means coacts with said deflecting means for removably mounting the latter in the device.

6. The combination of claim 5 and wherein said mounting means coacts with said deflecting means for mounting the latter for swinging movement about an axis parallel to the optical axis of the device.

7. The combination of claim 1 and wherein a drive means coacts with said airlock means for driving the latter, and coupling means coupling said moving means and drive means to each other for compelling said deflecting means to be moved by said moving means out of the path of movement of said airlock means.

8. The combination of claim 7 and wherein said coupling means coacts with said moving means and drive means for acting through said moving means and said deflecting means to situate the latter in its operating position both when the object is set into the object stage as well as when the object is in an airlock position situated at an airlock chamber of the device.

9. The combination of claim 7 and wherein said coupling means includes cams for providing alternate operation of said moving means and drive means and for providing a predetermined sequence of operation thereof.

10. The combination of claim 7 and wherein said coupling means includes a cam and said moving means includes a plunger coacting with said cam for being controlled thereby to displace sad deflecting means between said operating position thereof and an inoperative position, said coupling means coacting with said drive means to provide for operation of the latter only after said coupling means has actuated said moving means to displace said deflecting means to said inoperative position thereof.

11. The combination of claim 7 and wherein said moving means, drive means, and coupling means together form a common rotary transmission which includes a plurality of cam cylinders having cams which control the sequence of movement of said deflecting means and airlock means, and a plurality of cam followers coacting with said cam cylinders during rotary movement thereof for providing predetermined movements and sequence of movements of said deflecting means and airlock means.

12. The combination of claim 11 and wherein a spring means coacts with said deflecting means for urging the latter yieldably to said operating position thereof, one of said cam cylinders having a cam for controlling said moving means and said moving means including an elongated plunger coacting with said cam of said one cam cylinder to displace said deflecting means to said inoperative position thereof in opposition to said spring means when the remaining cam cylinders coact with said airlock means to displace said airlock member to said operating position thereof.

13. The combination of claim 12 and wherein said rotary transmission includes an outer manually turnable member, said one cam cylinder being connected to said latter manually turnable member for rotary movement therewith and having directed away from said manually turnable member said cam which coacts with said plunger, said rotary transmission including a stationary guide member coacting with said plunger to guide the latter for longitudinal movement during movement of said cam of said one cylinder with respect to said plunger.

14. The combination of claim 11 and wherein said drive means terminates in an output member, said airlock means including an elongated holding member detachably connected at one end to said object airlock member and being in the form of a lever having an end distant from said object airlock member pivotally connected to said output member of said drive means for turning movement with respect to the latter about an axis which extends perpendicularly with respect to the optical axis when said object airlock member is in its operating position and which extends parallel to said optical axis when said object airlock member is in an airlock position at an airlock chamber, said airlock means including a cam slide coacting with said lever for controlling the turning thereof with respect to said output member of said drive means, and those cam cylinders which coact with said airlock means providing during operation of said drive means when said axis of said lever extends perpendicularly or parallel to said optical axis a movement of said lever about said axis at its connection to said output member and with respect to said cam slide resulting in a substantially linear movement of said one end of said lever which is detachably connected with said object airlock member.

15. The combination of claim 14 and wherein said cam slide forms part of a sleeve which surrounds said output member of said drive means, and said cam slide having a portion extending in the direction of said lever and formed with a camming cutout serving as a slide, said lever carrying a cam follower which extends into said cutout.

16. The combination of claim 15 and wherein said cutout has the configuration of an arc of a circle.

17. The combination of claim 16 and wherein said cam cylinders which coact with said interlock means provide a turning of said output member of said drive means about an axis perpendicular to the optical axis during movement of the object airlock between its operating and airlock positions through an angle which is equal to the angle between a pair of straight lines passing through the object when said object airlock member is at said operating and airlock positions thereof and intersecting at the axis perpendicular to said optical axis about which said output member turns.

18. The combination of claim 17 and wherein said turning axis of said output member of said drive means is at the elevation of said object airlock member when the member is in said airlock position thereof and said angle through which said output member is turned being equal to 90°.

19. The combination of claim 17 and wherein said cam cylinders include an inner cam cylinder surrounding said drive means and formed with a camming slot, said output member carrying a cam follower which extends through said camming slot and an outer camming cylinder surrounding said inner camming cylinder and remaining stationary with respect thereto, said outer cylinder being formed also with a camming slot receiving said follower which is connected to said output member and extends through said camming slot of said inner cylinder, said slot of said outer cylinder having a configuration determining axial movement of said output member along said axis which is perpendicular to said optical axis and which provides for rotary movement of said output member together with said cam slide.

20. The combination of claim 19 and wherein said cutout of said outer cam cylinder has a U-shaped configuration which opens toward said lever.

21. The combination of claim 19 and wherein said inner and outer cam cylinders coaxially surround said output member of said drive means with said cam follower which is connected to the latter extending through said inner cylinder into said cutout of said outer cylinder.

22. The combination of claim 21 and wherein said cam slide forms part of a sleeve surrounding said output member of said drive means and formed with a longitudinal slot through which said follower connected to said output member extends to provide for rotary movement of said sleeve and cam slide together with said output member.

23. The combination of claim 14 and wherein said object airlock member includes an airlock plate carrying a specimen cartridge which extends from one surface of said plate, said plate carrying at an opposed surface thereof a pair of open claws, and said holding member having at said one end thereof transverse lugs overlapped by said open claws for providing a detachable connection between said holding member and said object airlock member.

24. The combination of claim 23 and wherein a spring means coacts with said claw members and lugs for urging them against each other.

25. The combination of claim 23 and wherein said open claw members have openings situated in a predetermined plane, and said airlock means when driven by said drive means displacing said one end of said holding member in a direction which moves said lugs in said plane of said openings of said open claw members.

26. The combination of claim 25 and wherein said drive means has an axis which is perpendicular to the optical axis, and one of said cam means which surrounds said drive means having a predetermined camming surface, a stationary follower coacting with the latter camming surface for displacing said output member of said drive means along said axis of the latter during rotary movement of the latter cam cylinder together with said drive means when said object airlock member is either in its operating position or in an airlock positon situated at an airlock chamber.

27. The combination of claim 26 and wherein said cam slide moves axially together with said latter cam cylinder along said axis of said drive means while being rotatable with respect to the latter cam cylinder.

28. The combination of claim 11 and wherein an outer housing wall forms part of the hollow evacuated interior of the device, said drive means extending through said outer housing wall, sealing means coacting with said drive means at the latter wall for providing a vacuum-tight passage of said drive means therethrough, and said cam cylinders being situated outwardly beyond said sealing means.

29. The combination of claim 11 and wherein the cams of said cam cylinders have a curvature which provides for said deflecting means, during movement of the latter away from said operating position thereof, a greater speed of movement than the speed with which said object airlock member moves.

30. The combination of claim 23 and wherein said plate, when said object airlock member is situated in an airlock position at an airlock chamber, forms an inner vacuum-tight airlock door for said chamber.

31. The combination of claim 30 and wherein a pawl means coacts with said plate for pressing the latter against said airlock chamber to fluid-tightly close the latter, an outer airlock door coacting with said chamber, and lock means coacting with both of said doors for alternately locking and unlocking the same, so that when one of said doors is locked the other of said doors is released for opening movement.

32. The combination of claim 31 and wherein said holding member carries a projection which turns said pawl means into its position holding said plate at said chamber during movement of said object airlock member to said airlock position thereof.

33. The combination of claim 14 and wherein said airlock means includes an additional lever forming with said first-mentioned lever part of a parallelogram linkage to provide for straight-line movement of said object airlock member.

34. The combination of claim 14 and wherein said output member of said drive means is composed of a pair of components one of which is turnably connected with said holding member and the other of which carries a cam follower, and said drive means including an adjusting means for interconnecting said components of said output member and for adjusting the distance between the turning axis of said holding member and said latter cam follower.

35. The combination of claim 1 and wherein said moving means coacts with said deflecting means for moving the latter in the direction of the optical axis away from said operating position thereof.

References Cited

UNITED STATES PATENTS 3,191,028   6/1965   Crewe.
3,316,402   4/1967   Schmidt.

RALPH G. NILSON, Primary Examiner

C. E. CHURCH, Assistant Examiner